J. EDSON.
Hose-Couplings.
No. 145,731.
Patented Dec. 23, 1873.
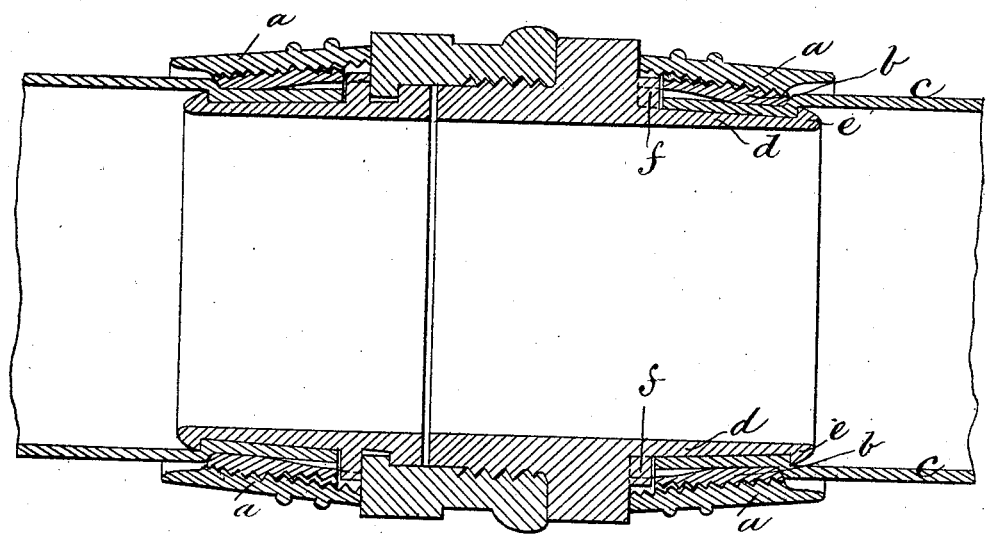
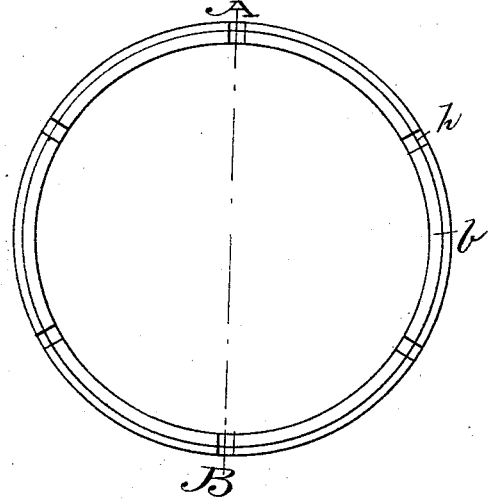
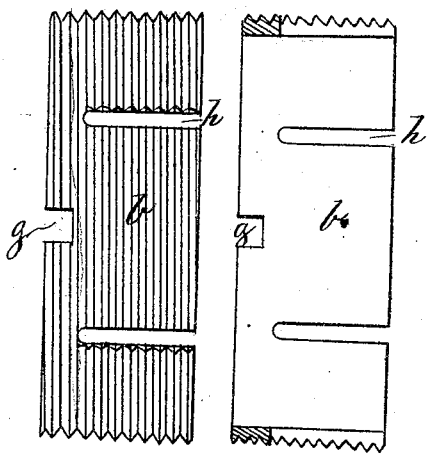
Witnesses:
George E. Phelps.
F. Gardner
Inventor:
Jacob Edson.
by Alban Andrew Atty.

UNITED STATES PATENT OFFICE.

JACOB EDSON, OF BOSTON, MASSACHUSETTS, ASSIGNOR OF ONE-HALF HIS RIGHT TO JOHN CLARK, OF SAME PLACE.

IMPROVEMENT IN HOSE-COUPLINGS.

Specification forming part of Letters Patent No. 145,731, dated December 23, 1873; application filed November 26, 1873.

*To all whom it may concern:*

Be it known that I, JACOB EDSON, of Boston, in the county of Suffolk and State of Massachusetts, have invented certain new and useful Improvements in Hose-Couplings; and I do hereby declare the following to be a full, clear, and exact description of the invention, such as will enable others skilled in the art to which it pertains to make and use it, reference being had to the accompanying drawings, which form part of this specification.

My invention relates to improvements in hose-couplings, consisting in the employment of a compressible slotted screw-threaded sleeve, that is compressed around the end of the hose by means of a tapering nut screwed over the aforesaid compressible sleeve. The hose surrounds a projecting annular shank, the extreme end of which is provided with an external annular lip or flange, between which and the end of the aforesaid slotted sleeve the hose is forced in the direction of its length, whereby it is still firmer secured between the shank and the compressible slotted sleeve. To prevent the slotted sleeve from turning with the tapering nut, I make projections on the shank, in combination with slots or recesses on the inner end of the above-named compressible slotted sleeve.

On the drawing, Figure 1 represents a central longitudinal section of my improved coupling, showing the hose secured thereto. Fig. 2 represents an end view of the compressible slotted sleeve. Fig. 3 represents a side elevation of Fig. 2; and Fig. 4 represents a cross-section on the line A B, as shown in Fig. 2.

Similar letters refer to similar parts wherever they occur on the different parts of the drawings.

$a$ represents a tapering nut, provided with a screw-thread on its inner side, as shown in Fig. 1. The nut $a$ is screwed over and surrounds a compressible cylindrical slotted sleeve, $b$, having a screw-thread cut, cast, or pressed on its outer circumference, as shown in Figs. 1, 3, and 4. The hose $c$ is held firmly in place between the compressed slotted sleeve $b$ and the shank $d$ of the coupling. To further secure the hose in position, I make an annular projecting lip or flange, $e$, on the outer end of the shank $d$, between which and the outer end of the slotted sleeve $b$ the hose $c$ is compressed lengthwise, when the tapering nut $a$ is screwed over the aforesaid slotted sleeve $b$, by which arrangement the hose is firmly secured between the said annular flange $e$ and the end of the sleeve $b$. On the shank $d$, or other suitable part of the coupling, I make one or more projections, $f f$, by which, and corresponding recesses or grooves $g g$ on the sleeve $b$, the latter is prevented from turning round when the tapering nut $a$ is screwed around it. The screw-threaded sleeve $b$ is slotted in a number of places, $h h h$, through a part of its length, but is not cut wholly through or split in any place, as fully shown in Figs. 2, 3, and 4. The inner diameter of the aforesaid sleeve $b$ is made a little larger than the outside diameter of the hose, so that the sleeve $b$ may be easily slipped over the hose previous to the compression of the sleeve $b$ by means of the tapering nut $a$. The object of the slots $h h h$ on the screw-threaded sleeve $b$ is to allow the outer end of said sleeve to be compressed or contracted around the hose when the tapering nut $a$ is screwed over the sleeve $b$.

Before the nut $a$ is screwed over the sleeve $b$, the latter is cylindrical, as shown in Figs. 3 and 4; but after the tapering nut $a$ is screwed over it, its outer yielding parts are compressed around the hose $c$, in a manner as fully shown in Fig. 1.

I am aware that a patent was granted to E. B. Juckett, dated September 9, 1862, and numbered 36,410, for hose-couplings, in which a split tapering ring is used, in combination with a tapering nut, for the purpose of securing a hose to a coupling, the disadvantage of which is that the flexible hose is very liable to double up in the space between the ends of the split tapering nut; and to obtain a tight connection in such cases it has been customary to place soft pieces of metal, such as zinc or suitable material, on each side of the seam thus formed; whereas I, with my invention of a cylindrical grooved sleeve with a number of narrow cuts, am able to compress the hose equally all round its circumference, and in this manner prevent the doubling up of the hose in any place. By the addition, also, of the projecting annular rim $e$ on the shank $d$, I compress the hose lengthwise between the rim $e$ and the open end of the sleeve $b$, whereby all leakage is effectually avoided.

To attach the hose to my improved coupling it is only necessary to slip it over the shank $d$, and slip the grooved sleeve $b$ over the hose so far that the projections $f f$ engage in the recesses $g\ g$ on the sleeve $b$, and compress said sleeve in its open end by screwing the tapering nut $a$ around it, in a manner as fully represented in Fig. 1.

To remove the hose from the coupling, I unscrew the tapering nut $a$, and bend the outer ends of the grooved sleeve $b$ outward, and withdraw it and the hose easily from the coupling.

Having thus fully described the nature, construction, and operation of my invention, I wish to secure by Letters Patent, and claim—

The combination of the tapering nut $a$, compressible sleeve $b$, and annular projection $e$, or its equivalent, for the purpose specified.

In testimony that I claim the foregoing I have hereunto set my hand this 20th day of November, 1873.

JACOB EDSON.

Witnesses:
ALBAN ANDRÉN,
GEORGE E. PHELPS.